(12) United States Patent
Senger

(10) Patent No.: US 6,505,969 B2
(45) Date of Patent: Jan. 14, 2003

(54) INTERLOCKING LINEAR ROLLER BEARING

(75) Inventor: Christopher G. Senger, Hamden, CT (US)

(73) Assignee: The Torrington Company, Torrington, CT (US)

(*) Notice: Subject to any disclaimer, the term of this patent is extended or adjusted under 35 U.S.C. 154(b) by 41 days.

(21) Appl. No.: 09/774,349

(22) Filed: Jan. 31, 2001

(65) Prior Publication Data

US 2002/0102036 A1 Aug. 1, 2002

(51) Int. Cl.[7] .............................. F16C 29/04
(52) U.S. Cl. ....................................... 384/56
(58) Field of Search ............... 384/50, 51, 52, 384/53, 59; 464/162, 167

(56) References Cited

U.S. PATENT DOCUMENTS

| | | | |
|---|---|---|---|
| 3,054,648 A | * 9/1962 | Bauer | 384/51 |
| 3,113,807 A | 12/1963 | Polidor | |
| 3,342,534 A | 9/1967 | King | |
| 3,591,906 A | * 7/1971 | Leiber | 384/53 |
| 3,659,909 A | 5/1972 | Egbert | |
| 3,790,233 A | 2/1974 | Polidor | |
| 3,887,155 A | * 6/1975 | Bertalot | 384/53 |
| 3,897,119 A | 7/1975 | McMurtrie | |
| 3,927,919 A | * 12/1975 | Bunzli | 384/51 |
| 4,334,717 A | 6/1982 | Polidor | |
| 4,796,516 A | 1/1989 | Horvath | 92/165 R |
| 4,923,311 A | 5/1990 | Gibbs et al. | 384/49 |
| 5,004,203 A | * 4/1991 | Fabius | 248/276.1 |
| 5,106,207 A | 4/1992 | Fry | 384/49 |
| 5,199,801 A | 4/1993 | Grehn et al. | |
| 5,201,584 A | 4/1993 | Simons | 384/49 |
| 5,345,679 A | * 9/1994 | Lennon et al. | 29/898.055 |
| 5,374,128 A | 12/1994 | Herbeck | 384/49 |
| 5,492,414 A | 2/1996 | Gilbert | 384/49 |
| 5,607,238 A | 3/1997 | Sherman | 384/49 |
| 5,672,010 A | 9/1997 | MacNicol et al. | 384/42 |
| RE36,005 E | 12/1998 | Herbeck | 384/49 |

FOREIGN PATENT DOCUMENTS

| | | |
|---|---|---|
| DE | 2446506 | 4/1976 |
| DE | 3720454 A1 * | 2/1988 |
| GB | 841810 | 7/1960 |
| GB | 867755 | 5/1961 |

* cited by examiner

*Primary Examiner*—Thomas R. Hannon
(74) *Attorney, Agent, or Firm*—Michael Best & Friedrich LLP

(57) ABSTRACT

A linear roller bearing includes a bearing cage retaining parallel rollers in a linear configuration. Side portions of the bearing cage extend laterally to form a mechanical interlock with an adjacent similar bearing cage such that, when two or more bearing cages are positioned about an inner tubular member for guided axial movement relative to a coaxial outer tubular member, the mechanical interlock prevents relative axial movement of the adjacent bearing cages. Adjacent bearing cages may be identical or of differing configuration provided a mechanical interlock preventing relative axial movement results. The linear roller bearing may include inner and outer races, or, alternatively, the tubular members may be formed with integral raceways.

15 Claims, 2 Drawing Sheets

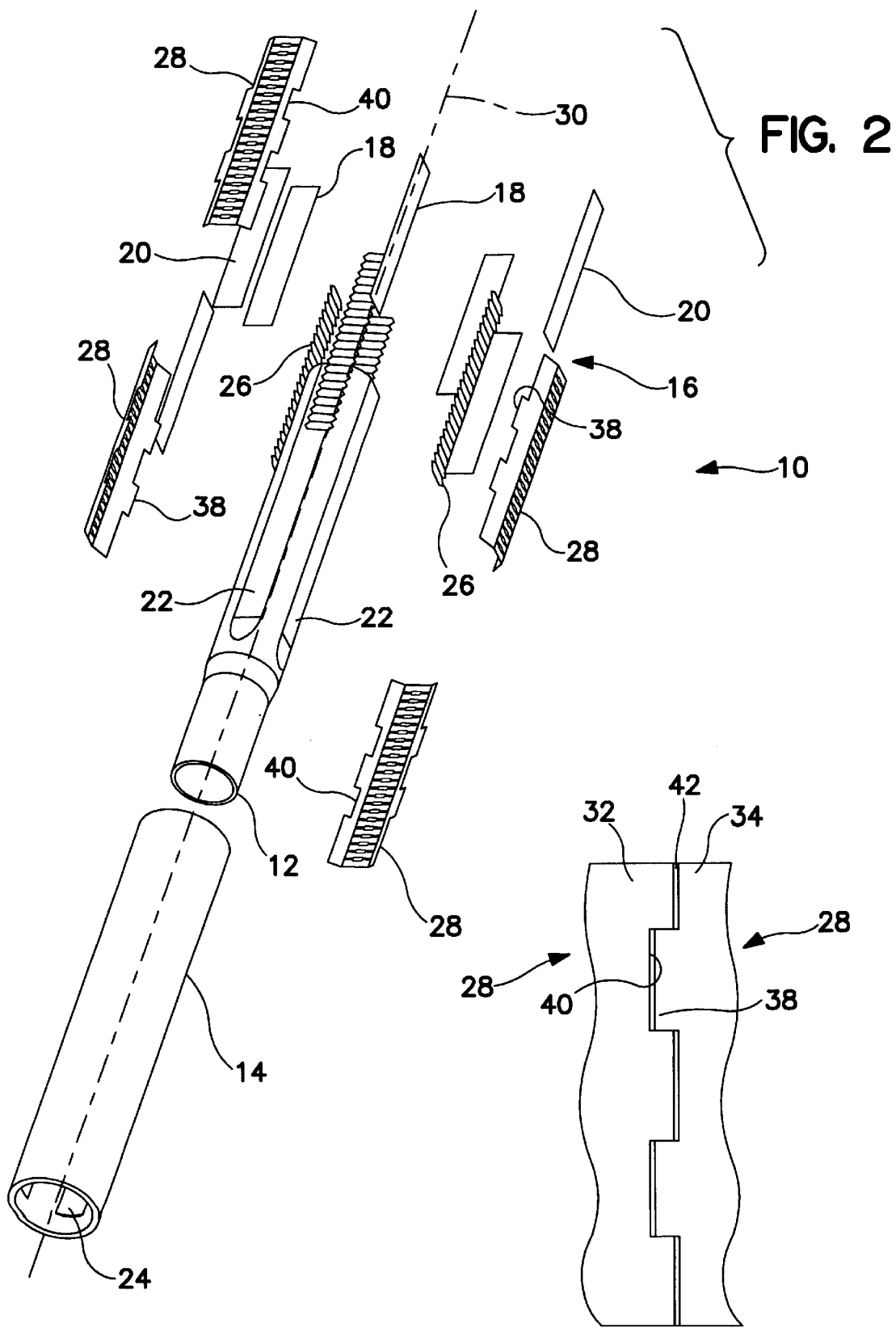

INTERLOCKING LINEAR ROLLER BEARING

BACKGROUND OF THE INVENTION

This invention relates generally to linear roller bearings and, more particularly, to linear roller bearings that may be used in coaxial, tubular arrangements that transmit torque from one tube to a coaxial tube while allowing free relative axial movement of the coaxial tubes.

With current linear roller bearing practice, parallel rollers may be retained in a crosswise orientation in elongated bearing cages, between inner and outer coaxial tubes, such that one tube can transmit torque to the other tube while being free to move axially with respect to the other. However, in applications where different magnitude loads and speeds result in high static friction, performance of such linear roller bearings may be unacceptable. The bearings can bind with high loads and the rollers can slide with low loads, such that the bearing cages may travel axially at different rates, resulting in bearing cages being located at different axial positions along the coaxial tubes. This misalignment of the bearing cages prevents the linear roller bearings from operating effectively to transmit torque and to facilitate free relative axial movement of the coaxial tubes.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a linear roller bearing for guiding axial movement of an inner tubular member with respect to a coaxial outer tubular member. The linear roller bearing comprises at least two pairs of elongated inner and outer linear bearing races, for extending axially with respect to an axis of coaxial tubular members and to be mounted on the inner and outer coaxial tubular members, respectively, such that the inner linear bearing race of each pair is radially aligned with and radially inward of the respective outer linear bearing race. A plurality of parallel rollers is positioned between each pair of inner and outer linear bearing races for rolling movement along the length of the inner and outer linear bearing races. The rollers between each pair of inner and outer linear bearing races are retained within a bearing cage extending laterally to form a mechanical interlock with an adjacent bearing cage to limit relative axial movement of the adjacent bearing cage.

In other aspects of the invention, this is accomplished by providing a coaxial tubular linear roller bearing arrangement and by providing a bearing cage for use in a coaxial tubular linear roller bearing arrangement.

The foregoing and other aspects will become apparent from the following detailed description of the invention when considered in conjunction with the accompanying drawing figures.

BRIEF DESCRIPTION OF THE DRAWING FIGURES

FIG. 2 is an exploded, perspective view of the coaxial, tubular linear roller bearing arrangement of FIG. 1;

FIG. 5 is a side view of portions of two adjacent linear bearing cages of the tubular linear roller bearing arrangement of FIG. 1, showing a mechanical interlock therebetween.

DETAILED DESCRIPTION

Figure 1:
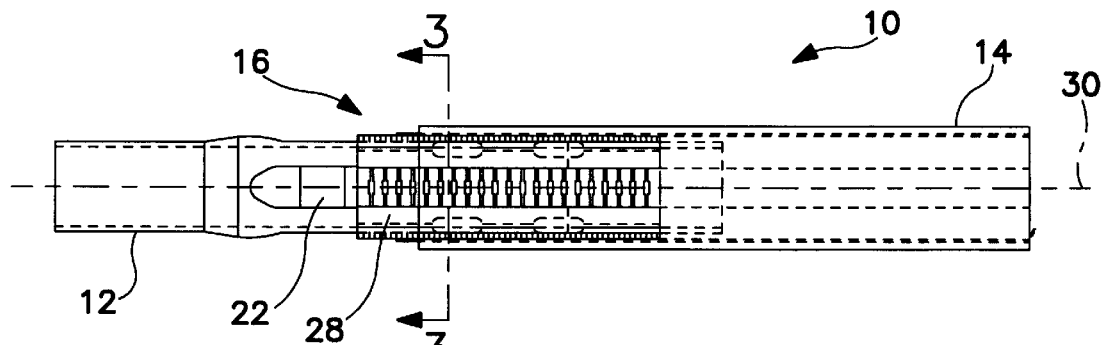
FIG. 1 is a side view of a coaxial, tubular linear roller bearing arrangement, illustrating a preferred embodiment of the interlocking linear bearing of the present invention.
Figure 3:
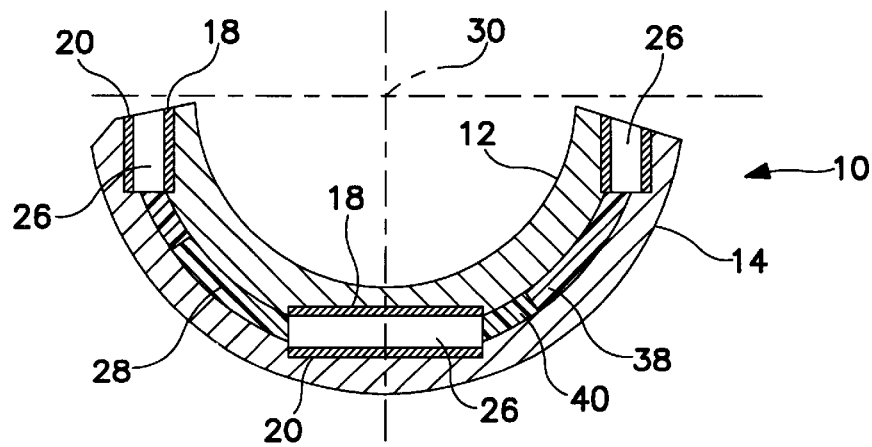
FIG. 3 is a cross-sectional view of a portion of the coaxial, tubular linear roller bearing arrangement of FIG. 1, as indicated by the line 3—3 of FIG. 1.

Referring now to the drawings, FIGS. 1 through 3 illustrate a coaxial, tubular linear roller bearing arrangement 10 having an inner tubular member 12 within a coaxial outer tubular member 14 and linear roller bearings 16 positioned therebetween for providing guided axial movement of the tubular members with respect to each other.

In this preferred embodiment of the present invention, linear roller bearings 16 include at least two pairs of elongated inner linear bearing races 18 and outer linear bearing races 20, positioned such that the inner linear bearing race 18 of each pair is radially aligned with and radially inward of the respective outer linear bearing race 20. Flat grooves 22 and 24 in the outer surface of inner tubular member 12 and in the bore of outer tubular member 14 receive the linear bearing races 18 and 20 to serve as backup members and prevent circumferential movement of the linear bearing races. Alternatively, if the tubular members 12 and 14 are made of suitable material, such as hardenable steel, for example, raceways may be formed integrally in the tubular members 12 and 14, thereby eliminating the need for separate linear bearing races 18 and 20.

Figure 4:
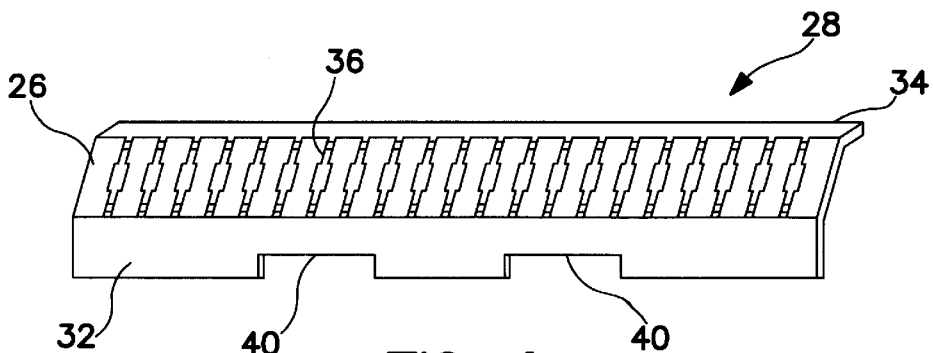
FIG. 4 is a perspective view of a linear bearing cage with rollers of the tubular linear roller bearing arrangement of FIG. 1.

Parallel rollers 26 are retained within a bearing cage 28 and are positioned between each pair of inner and outer linear bearing races 18 and 20 for rolling movement on the linear bearing races 18 and 20. The bearing cages 28 extend laterally, circumferentially with respect to axis 30 of the tubular members 12 and 14, as side portions 32 and 34 that form a mechanical interlock with side portions of an adjacent bearing cage 28. The bearing cages 28 may have molded roller pockets 34, of conventional configuration, for retaining the roll er s 26, as illustrated in FIG. 4. The mechanical interlock limits axial movement of one bearing cage 28 relative to an adjacent bearing cage 28.

As illustrated in FIGS. 4 and 5, the mechanical interlock may be formed by projections 38 on side portions 34 of the bearing cages 28 engaging corresponding recesses 40 on side portions 32, although tabs, fingers, chevrons, curves and other projections of various configurations may be used. Preferably, the interlock allows a degree of circumferential movement and radial movement of adjacent bearing cages 28, while preventing relative axial movement of the bearing cages, to allow for dimensional tolerances of the coaxial tubular linear roller bearing arrangement. The generally rectangular configurations of the projections 38 and recesses 40, in the preferred embodiment of the drawings, provide this feature, as demonstrated by the gap 42 illustrated in FIG. 5.

Each bearing cage 28 may be identical, with complementary tabs on opposite side portions as described above, for manufacturing simplicity. However, the bearing cages do not need to be identical and may be of various shapes, as long as the bearing cages are keyed together to prevent relative axial movement of the bearing cages. similarly, an intermediate member may be positioned between adjacent bearing cages, being mechanically interlocked with each of them, such that the two adjacent bearing cages are mechanically interlocked indirectly, without going outside the present invention. The bearing cages 28 may be made of a polymer, such as Acetal or Delrin, for example, metal or other materials. And, the number of linear roller bearings may be four, as illustrated, or 2, 3, 5 or other number.

From the above description, it will be apparent that the present invention provides a linear roller bearing suitable for applications where different magnitude loads and speeds result in high static friction. Even under such adverse circumstances, the bearing cages are maintained in correct relative position such that the linear roller bearing is torsionally rigid and provides free axial relative movement of coaxial tubular members without binding. The joint connecting adjacent bearing cages is flexible in the radial and circumferential directions to accommodate raceway tolerances while maintaining a desired relative axial position of the bearing cages.

Having described the invention, what is claimed is:

1. A linear roller bearing for providing guided axial movement of an inner tubular member with respect to a coaxial outer tubular member, the linear roller bearing comprising:
   at least two pairs of elongated inner and outer linear bearing races, for extending axially with respect to an axis of coaxial tubular members and to be mounted on the inner and outer coaxial tubular members, respectively, such that the inner linear bearing race of each pair is radially aligned with and radially inward of the respective outer linear bearing race; and
   a plurality of parallel rollers positioned between each pair of inner and outer linear bearing races for rolling movement along the length of the inner and outer linear bearing races;
   the rollers between each pair of inner and outer linear bearing races being retained within a bearing cage extending laterally to form a mechanical interlock with an adjacent bearing cage to limit relative lengthwise movement of the adjacent bearing cages, wherein the bearing cages have lateral edge portions that have at least one laterally extending tab that engages a corresponding recess of an adjacent bearing cage to form the mechanical interlock.

2. The linear roller bearing according to claim 1, wherein the bearing cages are identical, each bearing cage having tabs and corresponding recesses that are on opposite lateral edges.

3. The linear roller bearing according to claim 1, wherein the bearing cages are made of a polymer.

4. The linear roller bearing according to claim 1, wherein the number of pairs of inner and outer bearing races is four.

5. A linear roller bearing for providing guided axial movement of an inner tubular member with respect to a coaxial outer tubular member, the linear roller bearing comprising:
   at least two pairs of elongated inner and outer linear bearing races, for extending axially with respect to an axis of coaxial tubular members and to be mounted on the inner and outer coaxial tubular members, respectively, such that the inner linear bearing race of each pair is radially aligned with and radially inward of the respective outer linear bearing race; and
   a plurality of parallel rollers positioned between each pair of inner and outer linear bearing races for rolling movement along the length of the inner and outer linear bearing races;
   the rollers between each pair of inner and outer linear bearing races being retained within a bearing cage extending laterally to form a mechanical interlock with an adjacent bearing cage to limit relative lengthwise movement of the adjacent bearing cages, wherein the mechanical interlock of adjacent bearing cages allows lateral movement of one bearing cage relative to the adjacent bearing cage, to accommodate dimensional tolerances of the inner and outer bearing races.

6. A coaxial, tubular, linear roller bearing arrangement comprising:
   an inner tubular member having at least two elongated axially extending inner linear bearing raceways;
   an outer tubular member, coaxial with the inner tubular member, having an elongated axially extending outer linear bearing raceway radially outward of each inner linear bearing raceway, thereby forming a pair of inner and outer linear bearing raceways; and
   a plurality of parallel rollers positioned between each pair of inner and outer linear bearing raceways for rolling movement thereon;
   the rollers between each pair of inner and outer linear bearing raceways being retained within a bearing cage extending circumferentially to form a mechanical interlock with an adjacent bearing cage for limiting relative axial movement of the adjacent bearing cages, wherein the bearing cages have lateral edge portions that have at least one circumferentially extending tab that is located witnin a corresponding recess of an adjacent bearing cage to form the mechanical interlock.

7. The linear roller bearing arrangement according to claim 6, wherein the bearing cages are made of a polymer.

8. The linear roller bearing arrangement according to claim 6, wherein the number of pairs of inner and outer bearing raceways is four.

9. The linear roller bearing arrangement according to claim 6, wherein the inner and outer linear bearing raceways are on inner and outer linear bearing races, respectively, that are mounted on the inner and outer tubular members, respectively.

10. A coaxial, tubular, linear roller bearing arrangement comprising:
    an inner tubular member having at least two elongated axially extending inner linear bearing raceways;
    an outer tubular member, coaxial with the inner tubular member, having an elongated axially extending outsr linear bearing raceway radially outward of each inner linear bearing raceway, thereby forming a pair of inner and outer linear bearing raceways; and
    a plurality of parallel rollers positioned between each pair of inner and outer linear bearing raceways for rolling movement thereon;
    the rollers between each pair of inner and outer linear bearing raceways being retained within a bearing cage extending circumferentially to form a mechanical interlock with an adjacent bearing cage for limiting relative axial movement of the adjacent bearing cages, wherein the bearing cages are identical, each bearing cage having tabs and corresponding recesses that are on opposite lateral edges.

11. A coaxial, tubular, linear roller bearing arrangement comprising:
    an inner tubular member having at least two elongated axially extending inner linear bearing raceways;

an outer tubular member, coaxial with the inner tubular member, having an elongated axially extending outer linear bearing raceway radially outward of each inner linear bearing raceway, thereby forming a pair of inner and outer linear bearing raceways; and a plurality of parallel rollers positioned between each pair of inner and outer linear bearing raceways for rolling movement thereon;

the rollers between each pair of inner and outer linear bearing raceways being retained within a bearing cage extending circumferentially to form a mechanical interlock with an adjacent bearing cage for limiting relative axial movement of the adjacent bearing cages, wherein the mechanical interlock of adjacent bearing cages allows circumferential movement of one bearing cage relative to the adjacent bearing cage, to accommodate dimensional tolerances of the inner and outer bearing raceways.

12. A bearing cage for use in a coaxial, tubular, linear roller bearing arrangement comprising an inner tubular member having at least two elongated axially extended inner linear bearing raceways; an outer tubular member, coaxial with the inner tubular member, having an elongated axially extending outer linear bearing raceway radially outward of each inner linear bearing raceway, thereby forming a pair of inner and outer linear bearing raceways; and a plurality of rollers retained in a respective one of the bearing cages and positioned between each pair of inner and outer linear bearing raceways for rolling movement thereon; the bearing cage comprising:

an elongated member having a straight, longitudinal central portion with a plurality of crosswise parallel pockets for receiving rollers and having laterally extending side portions that are curved about a longitudinal axis and extend circumferentially to form a mechanical interlock with an adjacent similar bearing cage for limiting relative axial movement of the adjacent bearing cages.

13. The bearing cage according to claim 12, wherein the laterally extending side portions that have at least one circumferentially extending tab for engaging a corresponding recess of an adjacent bearing cage to form the mechanical interlock.

14. The bearing cage according to claim 12, wherein the bearing cage is made of a polymer.

15. The bearing cage according to claim 12, wherein the bearing cage is curved in cross section and extends circumferentially approximately 90 degrees with respect to an axis such that the bearing cage can be used with three other similar bearing cages in a coaxial, tubular linear bearing arrangement.

* * * * *

UNITED STATES PATENT AND TRADEMARK OFFICE
CERTIFICATE OF CORRECTION

PATENT NO.    : 6,505,969 B2
DATED         : January 14, 2003
INVENTOR(S)   : Christopher G. Senger It is certified that error appears in the above-identified patent and that said Letters Patent is hereby corrected as shown below:

<u>Column 2,</u>
Line 46, delete "roll er s" and insert -- rollers --.

<u>Column 4,</u>
Line 32, delete "within" and insert -- within --.
Line 49, delete "outer" and insert -- outer --.

Signed and Sealed this

Eleventh Day of March, 2003

JAMES E. ROGAN
*Director of the United States Patent and Trademark Office*